(12) United States Patent
Tenberge

(10) Patent No.: US 7,717,815 B2
(45) Date of Patent: May 18, 2010

(54) POWER-BRANCHED TRANSMISSION HAVING A PLURALITY OF TRANSMISSION RATION RANGES WITH CONTINUOUSLY VARIABLE TRANSMISSION RATIO

(75) Inventor: Peter Tenberge, Chemnitz (DE)

(73) Assignee: LuK Lamellen und Kupplungsbau Beteiligings KG, Bühl (DE)

( * ) Notice: Subject to any disclaimer, the term of this patent is extended or adjusted under 35 U.S.C. 154(b) by 650 days.

(21) Appl. No.: 11/491,541

(22) Filed: Jul. 22, 2006

(65) Prior Publication Data

US 2007/0021259 A1    Jan. 25, 2007

Related U.S. Application Data

(60) Provisional application No. 60/704,366, filed on Aug. 1, 2005, provisional application No. 60/725,882, filed on Oct. 11, 2005.

(30) Foreign Application Priority Data

Jul. 23, 2005   (DE) .................. 10 2005 034 524
Oct. 7, 2005    (DE) .................. 10 2005 048 071

(51) Int. Cl.
   *F16H 37/08* (2006.01)
(52) U.S. Cl. .................. 475/5; 180/65.235; 475/211
(58) Field of Classification Search ............. 180/65.2, 180/65.4, 65.7, 65.21, 65.22, 65.225, 65.23, 180/65.235; 475/5, 210, 211
See application file for complete search history.

(56) References Cited

U.S. PATENT DOCUMENTS

| | | | |
|---|---|---|---|
| 3,251,243 A | 5/1966 | Kress | 475/173 |
| 3,340,749 A | 9/1967 | Magg et al. | 475/211 |
| 4,553,450 A | 11/1985 | Gizard | 475/212 |
| 4,599,916 A | 7/1986 | Hirosawa | 475/210 |
| 5,564,998 A | 10/1996 | Fellows | 475/216 |
| 5,720,686 A | 2/1998 | Yan et al. | 475/211 |
| 6,306,057 B1 * | 10/2001 | Morisawa et al. | 475/5 |
| 2004/0224811 A1 | 11/2004 | Vornehm et al. | 475/207 |

FOREIGN PATENT DOCUMENTS

| | | |
|---|---|---|
| DE | 1 232 834 | 1/1967 |
| DE | 102 47 174 A1 | 5/2003 |
| DE | 103 58 114 A1 | 7/2004 |
| DE | 10 2004 056 234 A1 | 5/2006 |
| EP | 0 143 365 A1 | 6/1985 |
| WO | WO 03/047898 A1 | 6/2003 |
| WO | WO 2006/043812 A2 | 4/2006 |

* cited by examiner

*Primary Examiner*—David D Le
*Assistant Examiner*—Derek D Knight
(74) *Attorney, Agent, or Firm*—Alfred J. Mangels

(57) ABSTRACT

A power-branched transmission having a plurality of transmission ratio ranges and having a continuously variable transmission ratio. The transmission includes at least one drive shaft operatively connected to an engine with a rotationally fixed connection, a power divider, a variable speed drive, and an output shaft. The power divider is a planetary gear train and the drive shaft is directly coupled with the internal ring gear of the planetary gear train. Also disclosed is a shift system for such a transmission and a variable speed drive unit clutch arrangement.

18 Claims, 13 Drawing Sheets

| Operating Modes | | | Shift Element | | | |
|---|---|---|---|---|---|---|
| | | | 28 | 13 | 19 | 17 |
| Motorstart (Vehicle Stopped) | | | | ▨ | ▨ | |
| Only electrical switching | | | ▨ | | ▨ | |
| Underdrive | i = 3,8 ... 1 | FB1 | ▨ | ▨ | ▨ | |
| Overdrive | i = 1 ... 0,633 | FB2 | ▨ | ▨ | | ▨ |

Fig. 6

POWER-BRANCHED TRANSMISSION HAVING A PLURALITY OF TRANSMISSION RATION RANGES WITH CONTINUOUSLY VARIABLE TRANSMISSION RATIO

BACKGROUND OF THE INVENTION

1. Field of the Invention

The present invention relates to a power-branched transmission having a plurality of transmission ratio ranges and a continuously variable transmission ratio.

2. Description of the Related Art

Automatic transmissions having a continuously variable transmission ratio are gaining in interest due to the higher driving comfort and convenience, and particularly because of lower fuel consumption as compared with conventional stepped automatic transmissions in motor vehicles that operate with planetary gear trains. Such continuously variable transmissions typically contain a variator, or variable speed drive, which is formed by two parallel pairs of spaced conical disks around which an endless torque-transmitting means passes, and wherein the spacing between the conical disks of the respective conical disk pairs is variable in opposite directions to change the transmission ratio.

One problem with such variable speed drives is their limited transmission ratio variation range and their limited torque transmitting capacity. In order to increase the transmission spread, i.e., the transmission ratio variation range and the torque transmitting capacity, power-branched automatic transmissions have been created, with which the variable speed drive is connected to a gear train via at least one clutch in various ways. The variation range of the variable speed drive is traversed depending on the clutch position, while changing the ratio of the transmission as a whole in one direction or the other, so that an enlarged overall transmission ratio spread results while the variable speed drive ratio spread remains the same or is even reduced. Furthermore, at least in a power-branched transmission in which part of the drive torque is transmitted parallel to the variable speed drive through the clutch directly to the gear train or the take-off, a variable speed drive does not have to transmit the entire drive torque, as a result of which the torque transmitting capacity of the transmission is increased.

Such power-branched continuously variable transmissions have also become known as hybrid machines, i.e., with an integrated electrical machine.

Power-branched, continuously variable transmissions, so-called CVT transmissions, that have a planetary gear train in addition to the variable speed drive are known from U.S. Pat. No. 3,340,749 and from DE 12 32 834. The planetary gear train is integrated into the transmission in such a way that it is positioned between the take-off and the variable speed drive. The drive of the transmission is connected to one of the variable speed drive shafts in a rotationally fixed connection, but none of the rotary shafts has a rotationally fixed connection to the take-off.

From published German applications DE 102 47 174 A1 and DE 103 58 114 A1 transmission structures with a variable speed drive and a planetary gear train are known in which the planetary gear set is installed in such a way that it is positioned between the variable speed drive and the drive engine. That means that none of the variable speed drive shafts has a rotationally fixed connection to the drive engine, but one of the variable speed drive shafts has a rotationally fixed connection to the take-off from the transmission. In particular, in those structures the drive engine is connected to the planet pinion carrier of the planetary gear train, and the planetary gear train is executed as a negative gear train. Those structures are therefore favorable in terms of uniform division of power, a fact that is attributable to the planet pinion carrier being connected to the transmission input. On the other hand, it is relatively complicated to implement a reverse gear, so that an additional shaft is usually necessary to reverse the direction of rotation at the output side.

Starting from that as a basis, an object of the present invention is to provide a power-branched transmission having a plurality of transmission ratio ranges with continuously variable transmission ratio, wherein the power division is matched to the utilization of the various transmission ratios in a passenger car transmission.

Those problems are solved with a power-branched transmission in accordance with the invention as herein described and claimed.

SUMMARY OF THE INVENTION

In particular, a power-branched transmission having a plurality of transmission ratio ranges with continuously variable transmission ratio includes a drive shaft to be connected to an engine with a rotationally fixed connection, a power divider, a variable speed drive and an output shaft, the power divider being a planetary gear train and the drive shaft being directly coupleable with the internal ring gear of the planetary gear train.

In addition, a shift system for a power-branched transmission having a plurality of transmission ratios is provided that ensures short shift paths. Furthermore, a freewheel state is provided which, in combination with suitable operation of the variable speed drive, enables jerk-free shifting. Finally, a variable speed drive clutch unit is provided that can be integrated compactly into a variable speed drive unit.

Underlying the invention is the idea that a non-equal division of power in the planetary gear train is intentionally exploited, and that the gear train is thus matched to the non-equal use of the various transmission ratios of an automobile transmission. Hence, in the most frequently used transmission ratios the variable speed drive can be especially relieved, i.e., it can be adapted, so that it has to transmit relatively little torque. That lessens problems such as the endless torque-transmitting means running into the pulleys, and is achieved in particular when the planetary gear train is designed not as a conventional negative gear train but as a positive gear train, i.e., with a reversing planetary gear set. Especially favorable power transmission can then be achieved by means of the planetary gear set, and after a non-equal division of power in the planetary gear train, for example into two operating regions representable with the planetary gear train, part of the torque bypasses the variable speed drive and flows to the take-off.

Preferably, a clutch is provided between the drive shaft and the internal ring gear of the planetary gear train. That is especially advantageous if at the same time there is an electric motor, so that the transmission provides a purely electrical maneuvering option without any transmission of power through the clutch between the drive shaft and the internal ring gear. At the same time, if appropriately constructed the clutch acts as a vibration damper between the engine and the drive shaft.

In that case the variable speed drive is located in the power stream between the power divider transmission and the transmission output shaft, so that in the driving mode the power of the internal combustion engine is preferably unequally divided in the planetary gear train, so that a first part can flow directly to the take-off, while another part flows to the take-off by way of the variable speed drive.

Preferably there is an electrical machine (e-motor) integrated into the transmission and located between the power divider transmission and a transmission output shaft, in accordance with a preferred embodiment. The electrical machine can be used both to support the power of the internal combustion engine in the driving mode, so that part of the power is provided by the electrical machine, and can also be used, for example, for electrical maneuvering, where no power is needed from the internal combustion engine. Finally, by means of the electric motor and by integrating the electrical machine appropriately, it is also possible to start an internal combustion engine that can be very cold. In order to shift the various operating modes, suitable clutches are provided that direct the flow of torque appropriately. The alternative possibilities for starting the internal combustion engine make it possible, for example, to take different engine temperatures into account.

If an e-motor is provided, preferably the branching of the power stream in the power divider transmission is such that the transmission output shaft can be connected to the drive shaft while bypassing the variable speed drive, and the transmission output shaft can be connected to the drive shaft by way of the variable speed drive. That makes it possible to create two different operating regions, with the output coming either via a shaft that is connected to the sun gear of the planetary gear train or from a shaft connected to the planet pinion carrier of the planetary gear train.

The electrical machine is therefore preferably connected to a shaft that is connected to the sun gear of the planetary gear train with a rotationally fixed connection.

In accordance with a preferred embodiment, the e-motor is integrated into the transmission housing that also contains the variable speed drive and the power divider transmission. Viewed in a longitudinal direction of the transmission from the input drive shaft to the transmission output shaft, the electrical machine is preferably positioned on one side of the variable speed drive and the power divider transmission on the other side of the variable speed drive. That results in favorable and potentially modular utilization of the construction space, since components that generally do not have to be adapted are positioned on one side of the transmission part. The electrical machine, which contributes a significant part of the cost of the transmission, can be tailored to fit the vehicle type and the customer's wishes in regard to size and construction space restriction, because of its location on the other side of the variable speed drive, separate from the components that normally do not need to be specially dimensioned. That arrangement therefore makes it possible to provide a compact transmission, in which the electrical machine is integrated into the transmission housing, but which is nevertheless flexible in regard to the customer's wishes.

Preferably, the transmission housing includes at least two transmission housing components, with the e-motor or electrical machine being accommodated in a separate transmission housing component that can be flange-mounted on the part of the transmission housing that accommodates the variable speed drive and the power divider transmission.

Especially favorable is an arrangement of the variable speed drive shafts and the drive and transmission output shafts such that the drive shaft and/or the transmission output shaft run parallel to and outside of a plane described by the variable speed drive shafts. Normally the drive shaft and the output shaft also run directly parallel to the variable speed drive shafts.

In accordance with a preferred embodiment, the planetary gear train is executed as a reversing planetary gear train.

To do justice to the various torque streams in the transmission, in accordance with a preferred embodiment a clutch is provided with which a shaft that is connected to the sun gear with a rotationally fixed connection, or a shaft that is connected to the planet pinion carrier of the planetary gear train with a rotationally fixed connected, can optionally be connected. That makes it possible to provide two operating regions, one of which is picked up through the shaft that is connected to the sun gear of the planetary gear train with a rotationally fixed connection, and the other through the shaft that is connected to the planet pinion carrier of the planetary gear train with a rotationally fixed connection.

A shift system for a power-branched transmission having a plurality of transmission ratio ranges with continuously variable transmission ratio includes a first shaft and a second shaft, which are arranged along a common axis, and whose outer surfaces are each provided with a toothed profile, at least in a boundary region between the first and the second shaft, and which are axially aligned. A hollow shaft surrounds the first and second shafts and is provided with inner teeth in the boundary region of at least the first or the second shaft. In addition, a ring-shaped shift element is provided that surrounds the first and/or second shaft and that has internal teeth that can be brought into engagement with the respective tooth profiles of the first and/or second shaft. The external teeth of the shift element can be brought into engagement with the internal teeth of the hollow shaft. The shift element can be moved in the axial direction of the first and second shafts and of the hollow shaft by an actuating device, so that it can be brought into engagement simultaneously with the internal teeth of the hollow shaft and the external teeth of the first or second shaft, or simultaneously with the external teeth of the first and the second shafts. Between the various engagement states the shift element does not pass through any specially reserved neutral region, which means that preferably the first and the second shaft are positioned directly adjacent to each other. The internal teeth of the hollow shaft are aligned with the external teeth of one of the two shafts in such a way that in the axial direction the internal tooth region of the hollow shaft corresponds to the length of the shift path of the shift element. That makes it possible to avoid a neutral region when shifting the shift element, which is why the shift paths are short. The shift element is preferably made without a backing, in order to prevent jamming when removing it. At the same time, by dispensing with the backing the transmission surface for the torque can be enlarged without the need for an increase in construction space.

The shift element is operated hydraulically for example. Hydraulic pressure chambers can be provided that are fixed, i.e., that do not rotate with the shafts.

Preferably, to operate the shift element a sliding sleeve is provided that turns synchronously with the hollow shaft, and which has a pin that extends through an elongated opening provided in the hollow shaft. The pin is engaged with the shift element in such a way that it causes the shift element to move axially.

To operate the sliding sleeve, there preferably is a gearshift fork that is rotationally fixed with respect to the shafts, and which is operated hydraulically by means of pressure chambers that also are stationary. The pressure chambers are preferably cylinders positioned concentric with the shaft.

Such a shift system is preferably utilized in a power-branched transmission having a plurality of transmission ratio ranges with continuously variable transmission ratio in such a way that the clutch arrangement between the output shaft, a shaft that rotates with the planet pinion carrier of the planetary gear train, and a shaft that rotates with the sun gear of the planetary gear carrier is formed by the shift system. The transmission, as a power divider transmission, includes a planetary gear train in addition to a variable speed drive for the continuously variable adjustment. That makes it possible to achieve short shift paths for that clutch arrangement, and at the same time it is possible to dispense with a backing, which is necessary in conventional shift elements so that they do not fly out under load but remain activated. Instead, with the clutch arrangement in accordance with the invention reliable disengagement of the clutches can be ensured.

To operate the shift arrangement it is necessary for shafts that are to be coupled to be synchronized. That synchronization exists when the range change transmission ratio is set with the help of the variable speed drive. The exact time coincidence of the shift actuation with hitting the range change transmission ratio is difficult to control. To solve that problem, a freewheel system is provided in the transmission; locking it forces synchronization. That ensures that the shift system can be operated without problems.

The freewheel system is utilized at the power divider transmission in such a way that it prevents overtaking of a shaft, and thus forces the entire planetary gear set into synchronization. That situation of "attempted overtaking" is produced by the fact that the variable speed drive not only triggers the shift speed ratio, but is triggered in such a way that it would adjust beyond the shift speed ratio.

A variable speed drive clutch element for connecting a variable speed drive to an opposing part for frictional transmission of power contains a frictional surface arrangement, where the frictional surface of one side of the clutch is rigidly connected to one disk of the variable speed drive. The clutch arrangement can be, for example, a single disk, a multiple disk, or a conical clutch, with multiple disk clutches being preferred. Here the outer plates are rigidly connected to a disk of the variable speed drive, for example, while the inner plates are provided on an opposing part.

The frictional surface provided on the variable speed drive is preferably introduced into a recess in the fixed disk of the variable speed drive. That permits an especially space-saving arrangement. The relatively severe bending of the variable speed drive shaft and the accompanying locally uneven loading of the clutch linings are accepted in that arrangement of the clutch. One side of the clutch is intentionally connected very rigidly with the variable speed drive, in particular with the fixed disk.

To better compensate for the variation, a deformation compensating part that compensates for the deformation of the variable speed drive shaft is preferably inserted between the frictional surface arrangement and the opposite part. For example, the deformation compensating part can be in the form of socket teeth. That ensures, for example, that teeth on the opposite part are adequately uncoupled from the variable speed drive deformation, so that the changes in the tooth contact pattern are acceptable.

For example, a pump unit can also be connected via such a deformation compensating part, so that the pump unit is not subjected to the full deformations of the variable speed drive shaft.

BRIEF DESCRIPTION OF THE DRAWINGS

The structure, operation, and advantages of the present invention will become further apparent upon consideration of the following description, taken in conjunction with the accompanying drawings in which:

FIG. 6 shows the shift states of various shift elements in various driving situations of a transmission in accordance with FIG. 1, 2, or 3;

DESCRIPTION OF THE PREFERRED EMBODIMENTS

Figure 1:
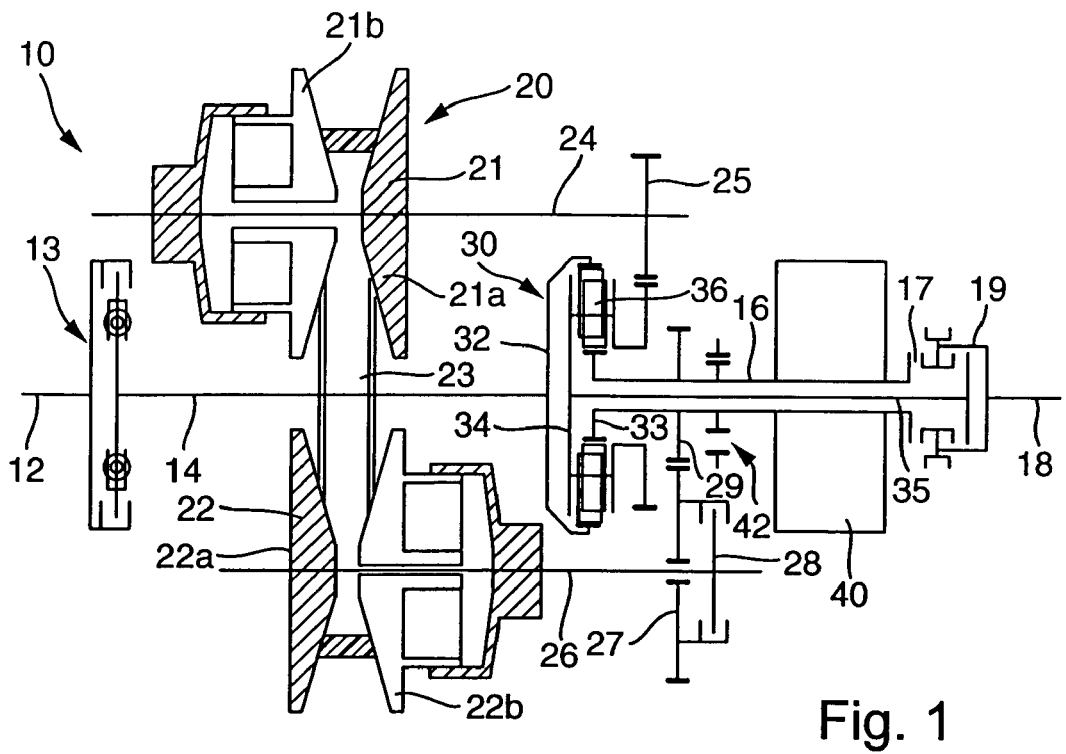
FIG. 1 is a schematic diagram of a transmission in accordance with the invention.

FIG. 1 shows a first embodiment of a power-branched transmission having a plurality of transmission ratio ranges, in particular two operating regions, with a continuously variable transmission ratio. In particular, power-branched transmission 10 has a variable speed drive unit 20, a planetary gear train 30, which is executed as a reversing planetary gear train, as well as an e-machine (electrical machine) 40. Starting for example from an internal combustion engine (not shown) of a motor vehicle, torque can be transmitted via an engine output shaft 12 to a drive shaft 14 of the transmission when clutch 13 between engine output shaft 12 and drive shaft 14 is engaged. In addition, drive shaft 14 is connected to internal ring gear 32 of planetary gear train 30 with a rotationally fixed connection. Sun gear 33 of planetary gear train 30 is connected with a rotationally fixed connection to a hollow shaft 16, which can be connected with a rotationally fixed connection to output shaft 18 of the transmission by way of a clutch 17. Electrical machine 40 sits on hollow shaft 16. Planet pinion carrier 34 of planetary gear train 30 is connected with a rotationally fixed connection to a shaft 35 that is connectable to output shaft 18 of the transmission by way of a clutch 19. Planet gears 36 mesh in a known way with internal ring gear 32 or sun gear 33.

Variable speed drive 20 has two pairs of conical disks 21, 22, which are encircled by a continuous torque-transmitting means 23. Each conical disk pair 21 and 22 has a fixed disk 21a, 22a and a movable disk 21b, 22b. The relative transmission ratio between variable speed drive units 21, 22 is adjustable by moving movable disks 21b, 22b toward or away from respective fixed disks 21a, 22a.

First conical disk pair 21 is connected with a rotationally fixed connection to a shaft 24, which is provided with rotationally fixed gearing or with an intermediate gear 25 that meshes with planet pinion carrier 34.

Second conical disk pair 22 is connected with a rotationally fixed connection to a shaft 26, which is connectable through a clutch 28 to an intermediate gear 27. Intermediate gear 27 meshes with gear 29, which is rotationally fixed on hollow shaft 16 and is executed for example as a gear wheel.

Finally, a pump unit 42 is also provided on hollow shaft 16, in order to be able to achieve adjustments through hydraulic pressure.

Figure 2:
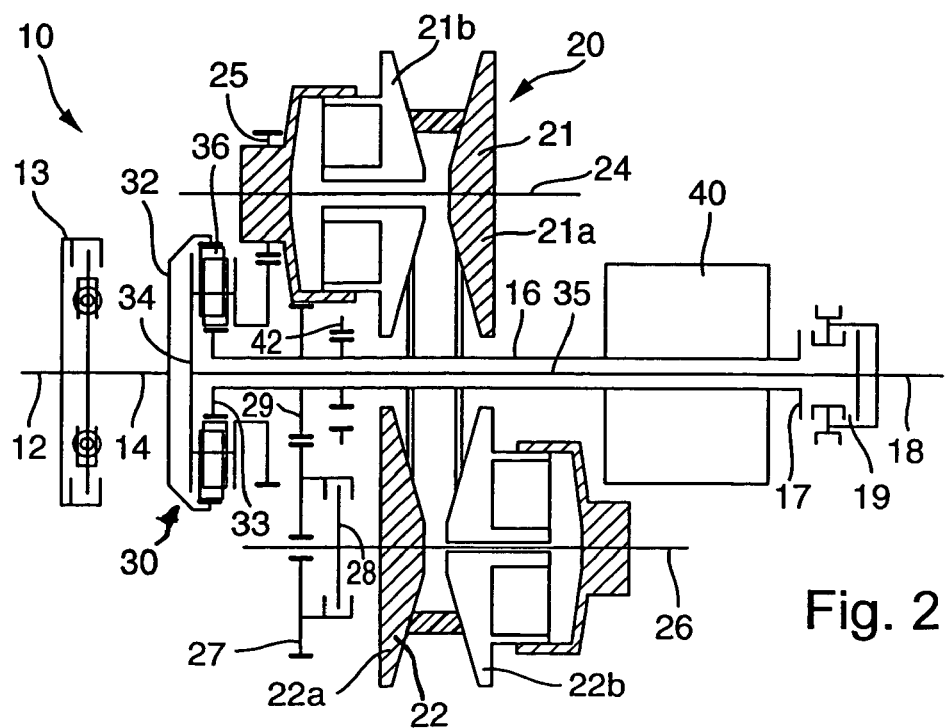
FIG. 2 is a schematic diagram of an alternative arrangement of a transmission in accordance with the invention.

The embodiment shown in FIG. 2 differs from the embodiment shown in FIG. 1, in which variable speed drive unit 20, planetary gear train 30 and electrical machine 40 are arranged in terms of their positioning in that order along the longitudinal axis of the transmission, i.e., the axial direction of shafts 12, 14, 16, and 18. To arrange the components efficiently in terms of space, those parts that are normally not subjected to any customer modifications are provided on one side of the relatively bulky variable speed drive arrangement 20 (the left side in FIG. 2), while the electrical machine 40, which is often subjected to modifications, is provided on the other side (the right side in FIG. 2). In particular, in the axial direction of shafts 14, 16 and 18, planetary gear train 30, variable speed drive unit 20 and electrical machine 40 are provided in that order. In addition, that arrangement has the advantage that the power-transmitting connection between hollow shaft 16 and the second conical disk pair 22 of the variable speed drive can also be integrated between the planetary gear train 30 and the variable speed drive 20 in terms of construction space. In particular, clutch 28, which allows or prevents transmission of torque between shaft 26 of second conical disk pair 22 and hollow shaft 16, can be integrated into fixed disk 22a of the second conical disk pair of the variable speed drive, as will be explained later. The intermediate gear 25 of the first variable speed drive unit 21 can also be connected directly to movable disk 21b of conical disk pair 21 in that case. That also allows a space-saving arrangement. Finally, the pump arrangement can be accommodated favorably in terms of space, and can be designed so that the hydraulic chambers, which are charged with hydraulic fluid by the pump unit 42, are positioned in a rotationally fixed arrangement.

Figure 3:
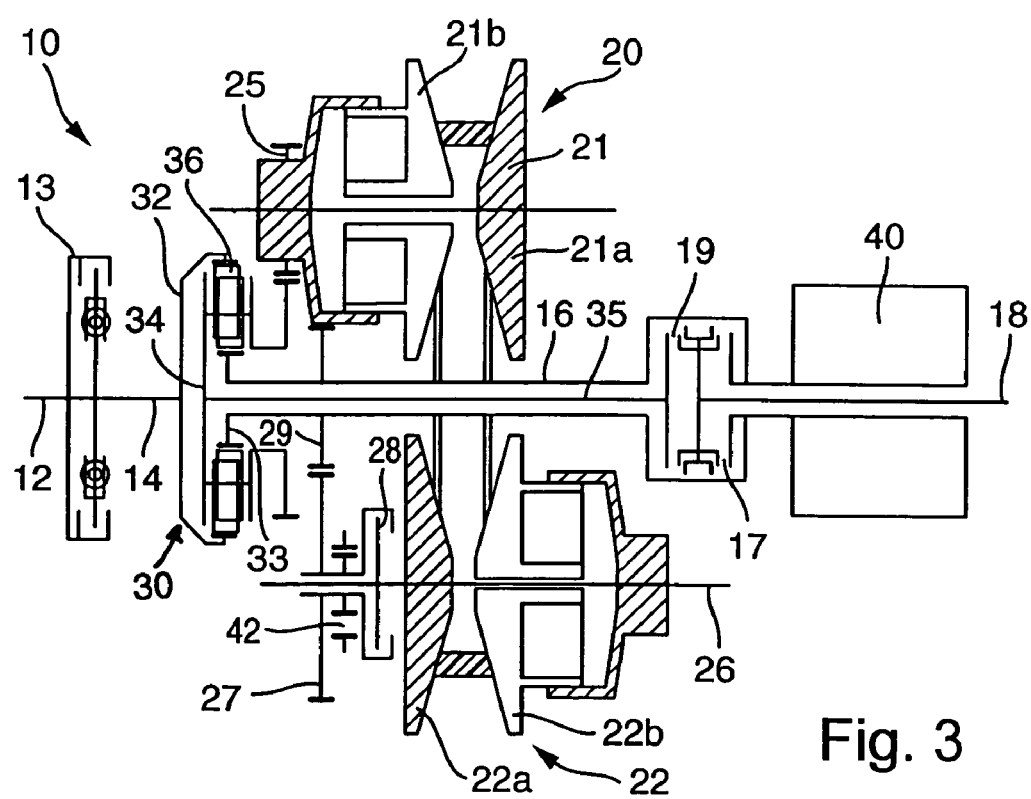
FIG. 3 is a schematic diagram of an additional alternative arrangement of a transmission in accordance with the invention.

The embodiment shown in FIG. 3 differs from the embodiment shown in FIG. 1 or FIG. 2, in which in terms of their positioning shift elements 17 and 19 are in immediate proximity to transmission output shaft 18, in that to achieve a space saving arrangement the shift elements are positioned on one side of electrical machine 40, further to the interior of the transmission 10. Because of the arrangement of the construction elements shown in FIG. 3, electrical machine 40 is now also in immediate proximity to transmission output shaft 18.

Another difference between the embodiment in FIG. 3 and that in FIG. 1 or 2 is the installation location of the pump 42. In FIG. 1 or 2 the pump is concentric and functional on the centrally located hollow shaft 16, while in FIG. 3, for reasons of construction space, it is concentric to the disk set shaft 26, although in terms of function it is unchanged in its connection to the hollow shaft 16 via the gears 29 and 27.

Figure 4:
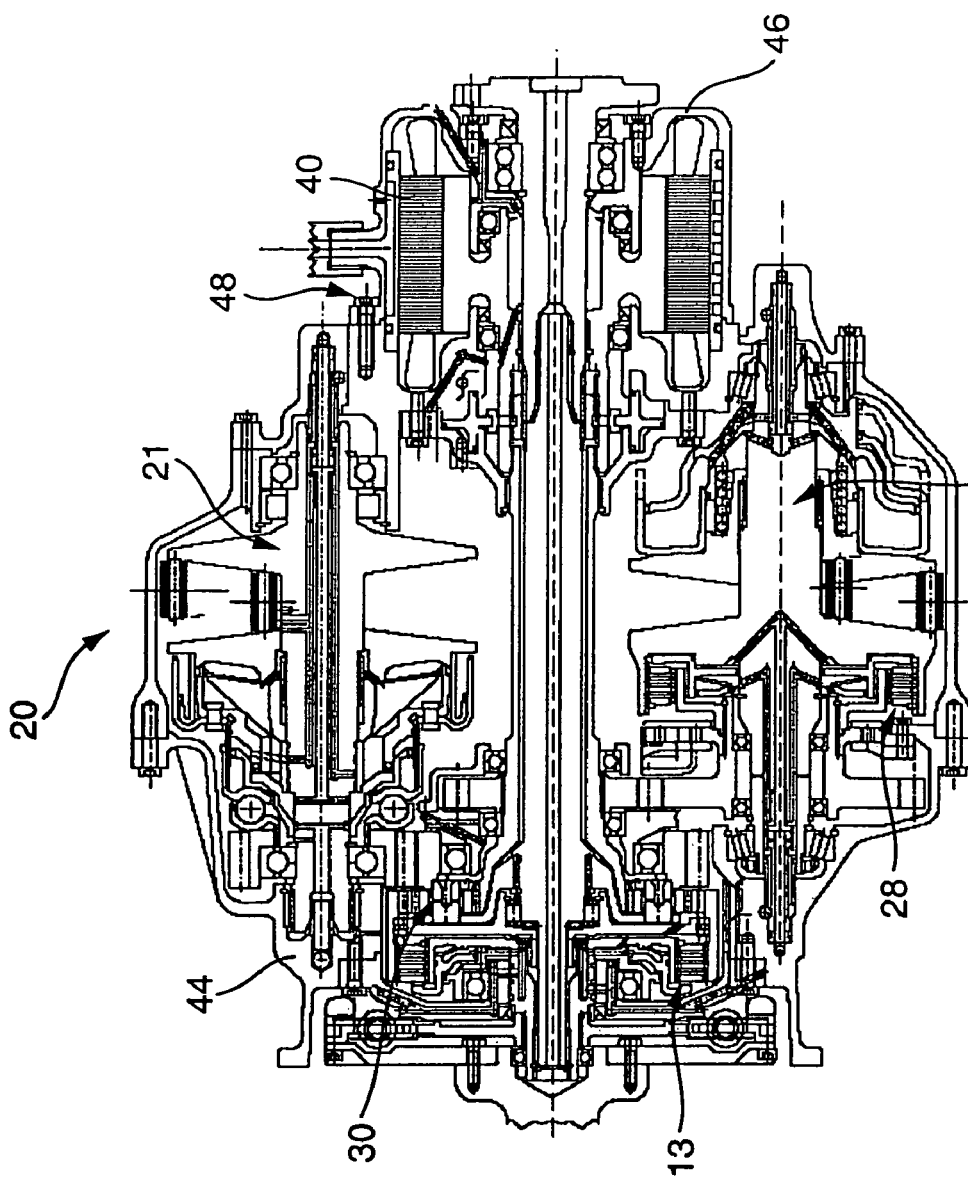
FIG. 4 is a longitudinal cross-sectional view through a transmission in accordance with FIG. 3.

In the arrangement shown in FIG. 3 it is particularly advantageous if the elements of power-branched transmission 10 (also shown in FIG. 4) that normally do not need to be modified are integrated into a housing of their own, as can be seen from FIG. 4. In particular, variable speed drive 20, planetary gear train 30, and the associated shafts, clutches, and hydraulic controls (not shown) are arranged as a module in forward housing component 44. Electric motor 40, as a hybrid module, is accommodated in a separate rear housing component 46, which can be dimensioned in accordance with the customer-specific, selectable size of electric motor 40. Furthermore, it can be secured on housing component 44 for example by means of flanges 48 and threaded connectors. Hence all the components that do not have to be adapted are in the forward housing component 44 shown in FIG. 4, while the e-motor is in the rear housing component 46. Depending upon the available construction space in the application of the transmission and the other adaptation wishes, a relatively large or a relatively small electrical machine 40 can be employed. In that case, in addition to the electrical machine itself, only its cooling system, which is integrated into rear housing component 46, and that housing component itself need to be re-dimensioned.

Figure 5:
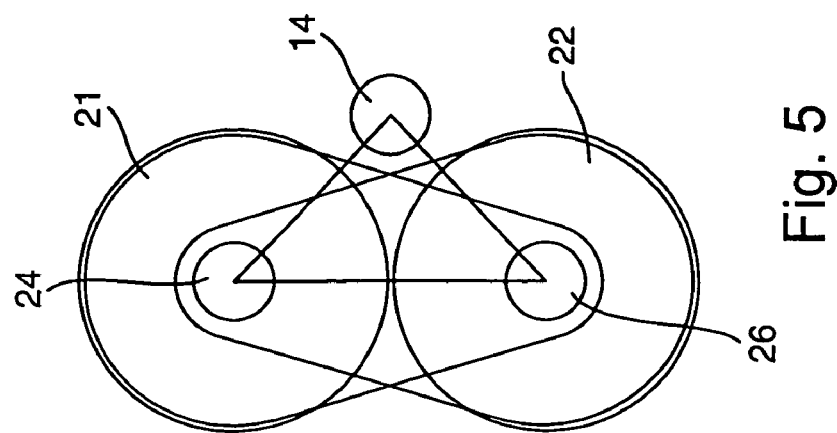
FIG. 5 is a side view of essential components of the transmission from FIG. 4.

In the embodiment shown in FIG. 4, as can be seen from an end view in FIG. 5, the variable speed drive with the variable speed drive disk sets 21, 22, carried in each case on separate parallel shafts, are positioned in such a way that variable speed drive shafts 24, 26 describe a plane that lies behind the drawing plane of FIG. 4, the variable speed drive conical disk pairs 21, 22 in FIG. 4 being turned up and down, respectively, for convenience of illustration in that drawing figure. Coaxial shafts 12, 14, and 16 shown in FIG. 3 lie parallel to variable speed drive shafts 24, 26, but outside of the plane described by them, as shown in FIG. 5.

The operation of a power-branched transmission in accordance with FIG. 1, 2, or 3, having two operating regions, will now be explained on the basis of the arrangement in accordance with FIG. 1. The method of operation of the transmission as shown in FIGS. 1, 2, and 3 corresponds, however.

The states of the clutches for starting the engine, for the purely electrical switchover and for the two operating regions (FB1, FB2) can be seen in FIG. 6, in which shaded boxes mean engaged clutches and empty boxes mean disengaged clutches.

Figure 7:
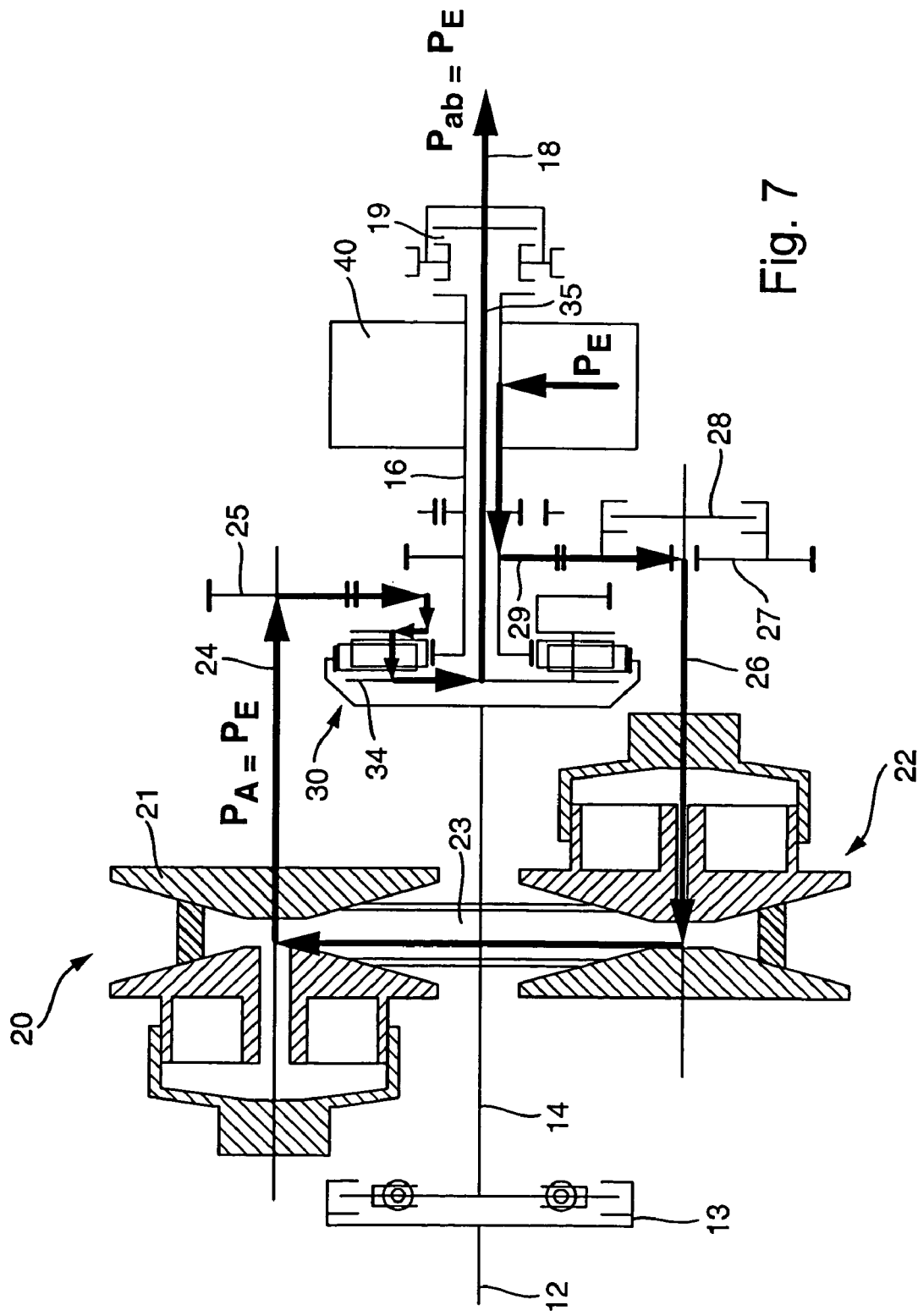
FIG. 7 is a schematic diagram of the flow of torque through the transmission in accordance with FIG. 1 when switching electrically.

FIG. 7 shows schematically the flow of torque for the purely electrical switchover, i.e., without drawing on the internal combustion engine. Accordingly, clutch 13 is disengaged, so that torque is not transmitted from the shaft 12 connected to the internal combustion engine (not shown) to the drive shaft 14.

The power $P_E$ produced by electrical machine 40 is transmitted by means of hollow shaft 16 and the rotationally fixed gear 29 on hollow shaft 16 to intermediate gear 27, and from there to shaft 26 of second conical disk pair 22. In addition, clutch 28 is engaged. From shaft 26 the torque is transmitted via second conical disk pair 22, endless torque-transmitting means 23 and first conical disk pair 21 of the variable speed drive to shaft 24, which is connected to first conical disk pair 21. Here the transmission ratio $i_{AB}$ between first conical disk pair 21 of the variable speed drive and second conical disk pair 22 of the variable speed drive corresponds to the minimum transmission ratio of the variable speed drive, and is 0.408, for example. The torque or power is finally picked up from shaft 24 of first conical disk pair 21 via the gear 25, which meshes with planet pinion carrier 34 of planetary gear train 30, and is transmitted to output shaft 18 via shaft 16, which is firmly connected with planet pinion carrier 34, by means of an engaged clutch 19. Hence the power $P_E$ supplied essentially by electric motor 40 can be picked up as output power $P_{ab}$ on output shaft 18. The internal combustion engine is stopped, and is uncoupled by means of clutch 13.

Figure 8:
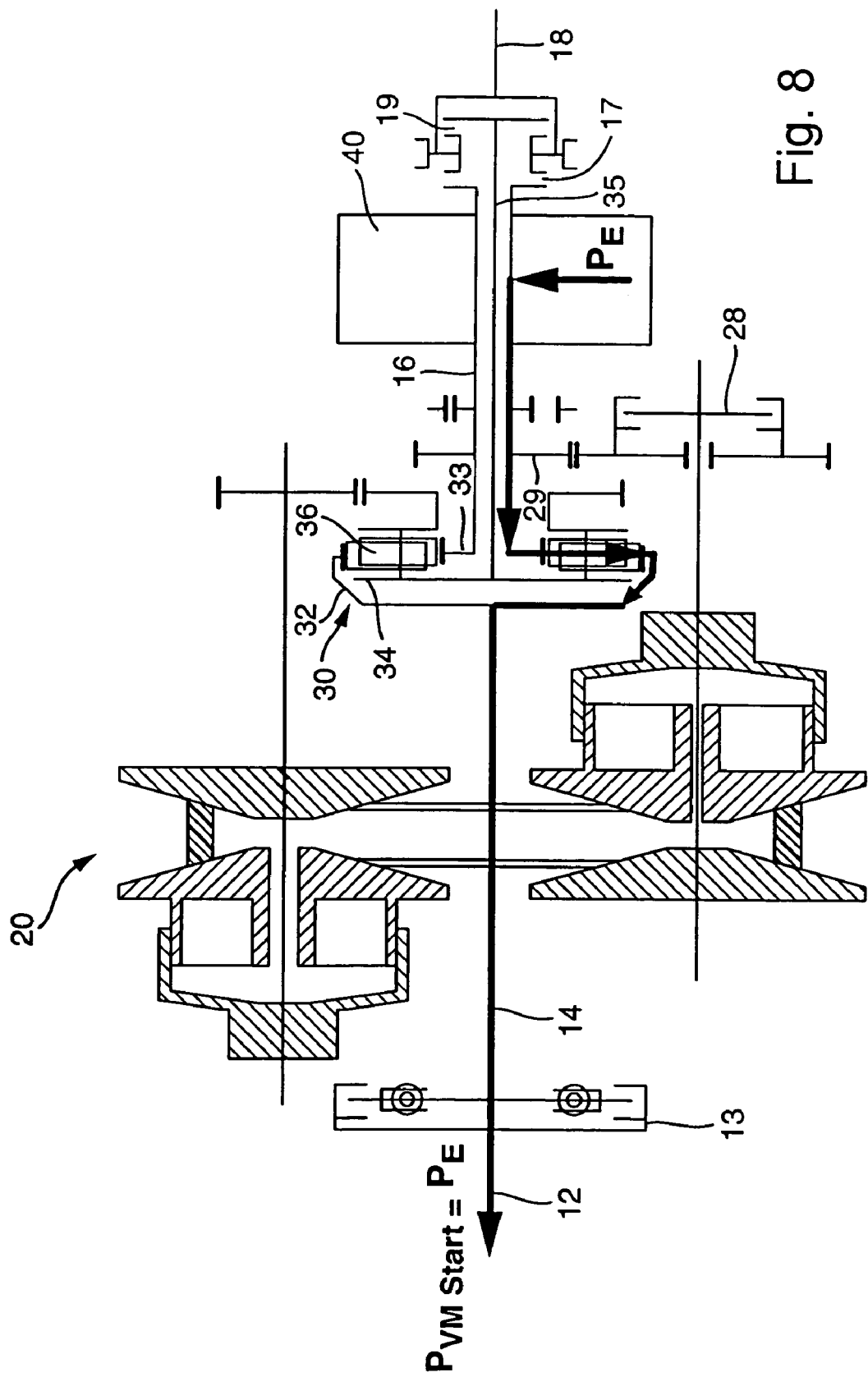
FIG. 8 is a schematic diagram of the flow of torque through the transmission in accordance with FIG. 1 in the case of electrical starting of the engine with the vehicle at a standstill.

A situation in the e-CVT operation, with which the internal combustion engine is started by means of the power of the electrical machine when the vehicle is standing still, is shown in FIG. 8. To that end, the power $P_E$ that is produced by electrical machine 40 is transmitted to hollow shaft 16. The output drive, in particular shaft 35 and output shaft 18, are stationary. In addition, clutch 19 is engaged while clutch 17 is disengaged, so that hollow shaft 16 can turn in accordance with the power $P_E$ of the electrical machine. The power $P_E$ is then transmitted from sun gear 33 via planet gears 36 to ring gear 32 while planet pinion carrier 34 is stopped, with allowance for the transmission ratio of planetary gear train 30. Here the transmission ratio of the planetary gear train is, for example, i=+1.784. Transmission ratios between +1.7 and +2 are especially favorable, in order to obtain high starting torque. From ring gear 32 the power is transmitted to drive shaft 14, which is firmly connected with ring gear 32, and from there, when clutch 13 is engaged, to engine output shaft 12 of the internal combustion engine. With such a starting procedure, with the at-rest transmission ratio of planetary gear train 30, even a small electrical machine can produce sufficiently high starting torque in most operating conditions. Since the output shaft 18 is stopped, and not turning in the opposite direction, for instance, after such an engine start the vehicle can be accelerated immediately. During electrical starting of the engine while the vehicle is stopped, the variable speed drive 20 remains unused. The starting power $P_{VMstart}$ applied to the engine corresponds essentially to the power of the electrical machine $P_E$. Clutch 28 is thus also disengaged.

Figure 9:
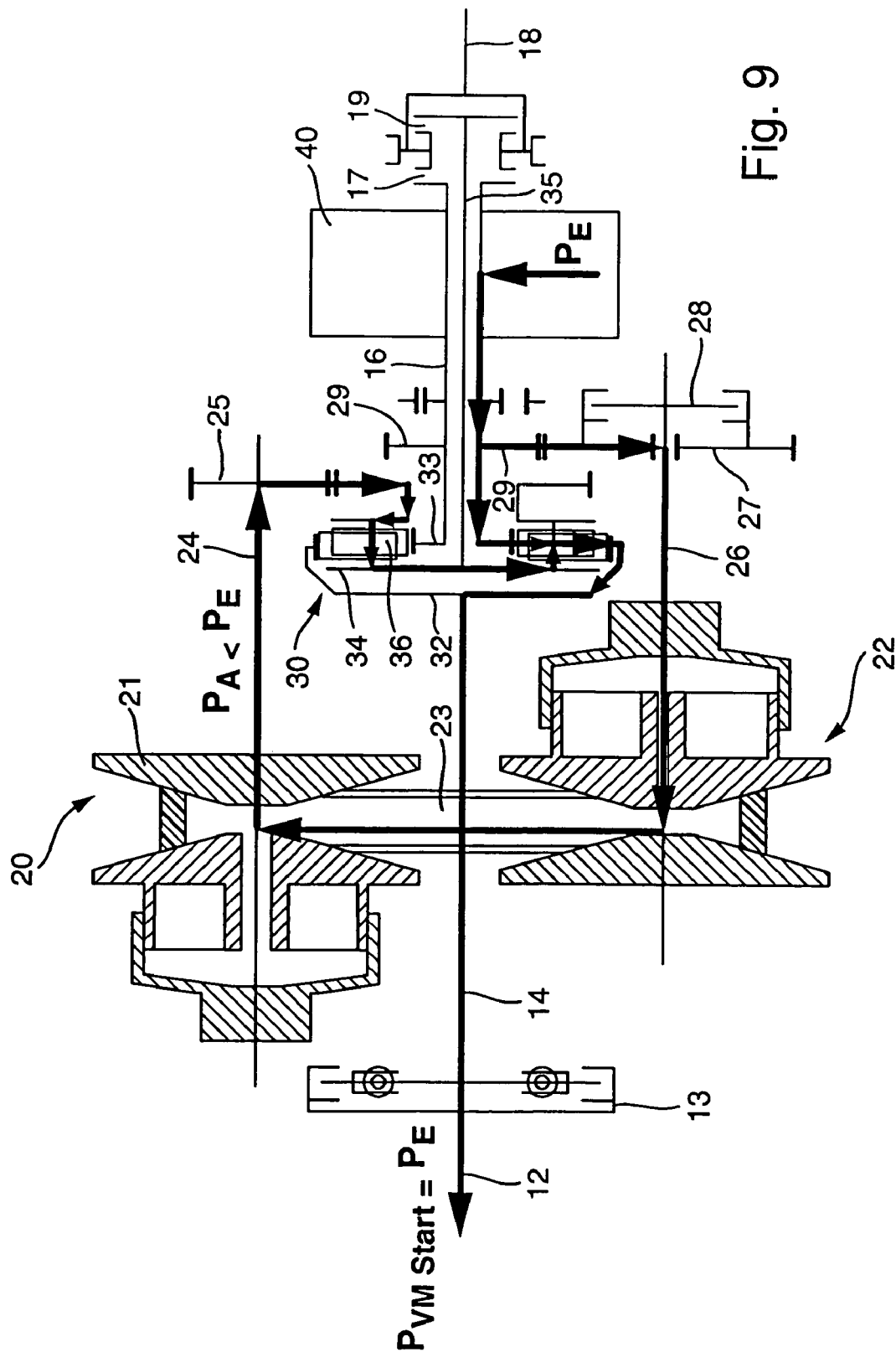
FIG. 9 is a schematic diagram of the flow of torque in the transmission in accordance with FIG. 1 in an alternative electrical starting of the engine.

In the operating situation shown in FIG. 9, which is used as an alternative to starting the engine by means of electrical machine 40, the clutch 28 between shaft 26 of the second conical disk pair 22 of variable speed drive 20 and hollow shaft 16 and the clutch 13 between engine output shaft 12 and drive shaft 14 are engaged. Clutches 17, 19, which connect hollow shaft 16 and shaft 35, which is firmly connected to planet pinion carrier 34 of planetary gear train 30, with output shaft 18, are disengaged. To start the engine, electrical machine 40 drives hollow shaft 16 to rotation with the power $P_E$. Through gear 29 and intermediate gear 27, with clutch 28 closed, part of the power of electrical machine 40 is transmitted to shaft 26, which is assigned to second conical disk pair 22. Utilizing the transmission of the variable speed drive 20, that power is transmitted via endless torque transmitting means 23 and first conical disk pair 21 to shaft 24, which is assigned to first conical disk pair 21. The power $P_A$ on shaft 24 is less than the power of the electrical machine 40. After utilizing the transmission of the variable speed drive 20, that power $P_A$ is transmitted via the gear 25, which meshes with planet pinion carrier 34, to planet pinion carrier 34 and from there via planet gears 36 to ring gear 32. That means that planet pinion carrier 34 and shaft 35, which is firmly connected to it, rotate as the transmission output shaft. With clutch 13 engaged, the power is transmitted from ring gear 32 to the internal combustion engine as starting power $P_{VMstart}$ by means of shaft 14, which is firmly connected to it. Since in the planetary gear train the transmission power is merged with the power branched off via the gear 29 and the clutch 28, and hence the branched-off power conducted via the variable speed drive is merged with the power that flows directly from hollow shaft 16 into the planetary gear train 30, the engine starting power in turn corresponds essentially to the power of the electrical machine. But since transmission output shaft 35 is turning, as explained, to start the vehicle in motion clutch 28 must be disengaged and clutch 19 must be engaged.

Figure 10:
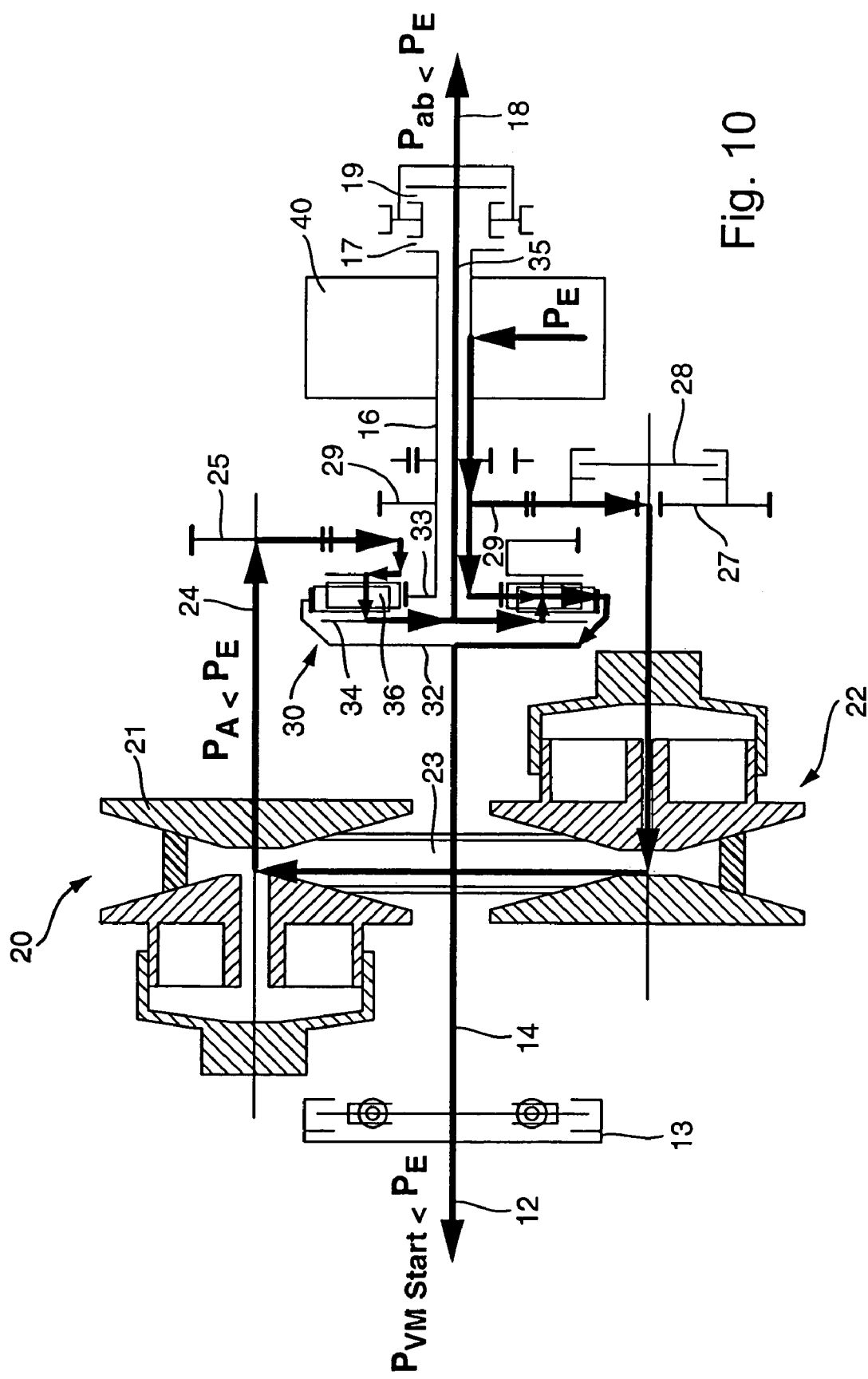
FIG. 10 is a schematic diagram of electrical starting of the engine from the switching schematic in a transmission in accordance with FIG. 1.

FIG. 10 shows the situation in which an electric engine start follows from the switchover. In contrast to the operating situation described in connection with FIG. 9, clutch 19 is also engaged, i.e., a connection is established between output shaft 18 and transmission output shaft 35 as the shaft that is firmly connected to the planet pinion carrier 32. That means that part of the power $P_E$ of electrical machine 4 is taken off as output power $P_{ab}$ while the other part of the power $P_E$ of electrical machine 40 is used as engine starting power $P_{VMstart}$. Clutches 13 between engine output shaft 12 and drive shaft 14, as well as clutch 28 between hollow shaft 16 and shaft 26, which is assigned to second conical disk pair 22, are engaged. Only clutch 17 between take-off shaft 18 and hollow shaft 16 is not engaged.

The transmission ratio $i_{BA}$ of the variable speed drive between second conical disk pair 22 and first conical disk pair 21 is maximal, i.e., $i_{Vmax}$=2.451, for example. Conversely, that means that the transmission ratio $i_{AB}$ between first conical disk pair 21 and second conical disk pair 22 of variable speed drive 20 is minimal ($i_{Vmin}$=0.408, for example). During starting of the engine, an acceleration pressure is thus prevented if the starting power is additionally supplied by the electrical machine, after an electrical switchover process, which is explained, for example, in FIG. 7. By engaging clutch 13 in comparison to the situation shown in FIG. 7, electrical machine 40 is overloaded briefly by applying the starting power for the internal combustion engine, which is only possible for combustion engines warmed up to operating temperature.

Figure 11:
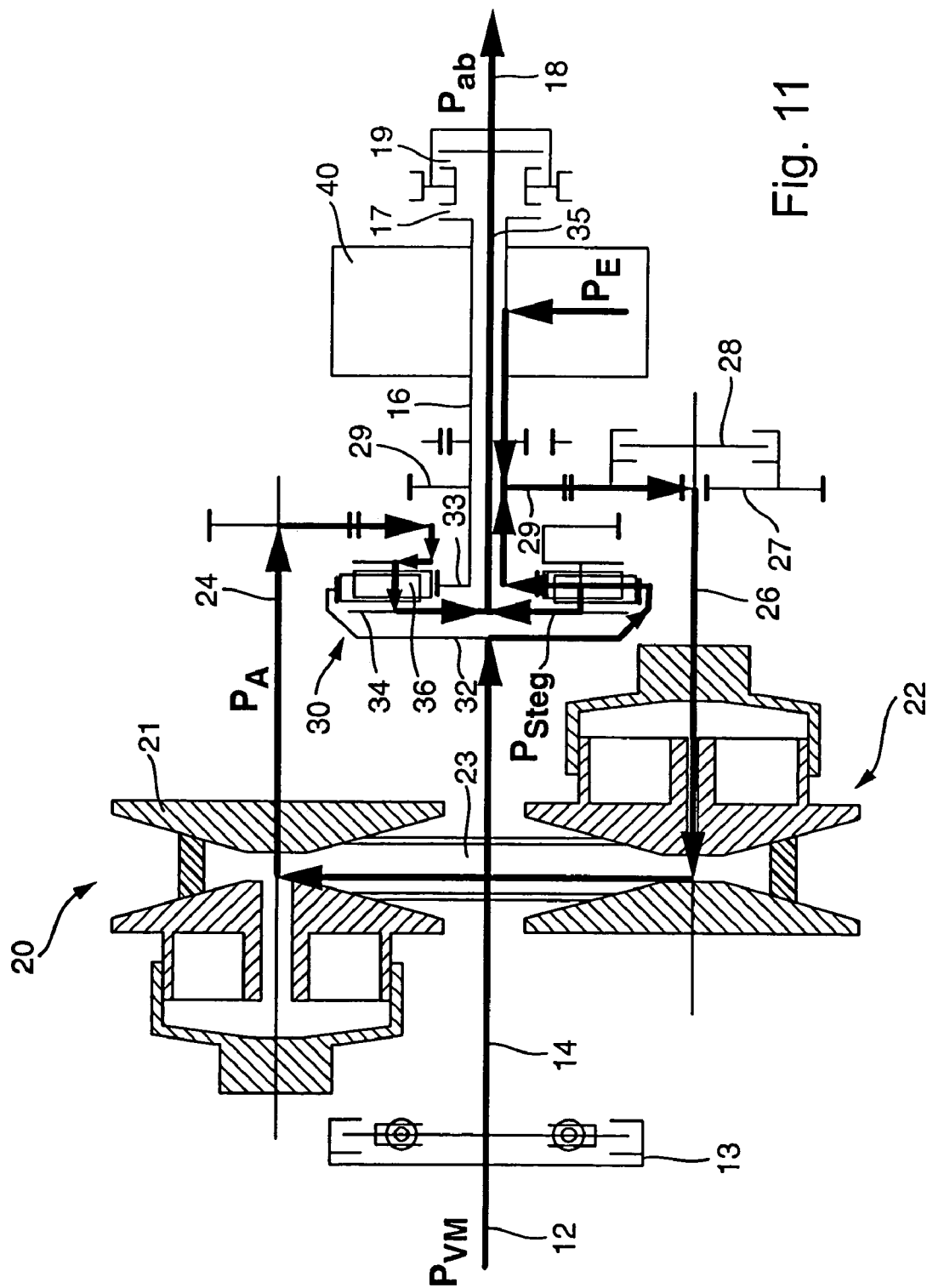
FIG. 11 is a schematic diagram of the flow of torque in the transmission in accordance with FIG. 1 in a first operating region.

FIG. 11 shows the e-CVT operation in a first operating region. The power $P_{VM}$ produced by the internal combustion engine (not shown) is delivered via engine output shaft 12 to drive shaft 14 with clutch 13 engaged, and flows from there through ring gear 32 of planetary gear train 30, which is firmly connected to drive shaft 14, into planetary gear train 30. The part $P_{Steg}$ of the drive power $P_{VM}$ of the internal combustion engine that is branched off in planetary gear train 30, by flowing from ring gear 32 through the planet gears 36 to planet pinion carrier 34 and is transferred from there through shaft 35, which is firmly connected to planet pinion carrier 34, and through engaged clutch 19 to output shaft 18, is smaller than the power $P_A$, also branched off in planetary gear train 30, which flows through variable speed drive 20, i.e. $P_{Steg}<P_A$. The power flowing via variable speed drive 20 is transmitted through transmission of the power from ring gear 32 via the planet gears 36 to sun gear 33, and further through hollow shaft 16, which is firmly connected to sun gear 33, through the rotationally fixed gear 29 provided on hollow shaft 16 and through intermediate gear 27 with clutch 28 engaged, to shaft 26, which is connected to the second conical disk pair 22 of the variable speed drive 20. The power $P_A$ that is transmitted through the variable speed drive is not only part of the power $P_{VM}$ of the internal combustion engine, but is augmented by the power $P_E$ of the electrical machine, which is also transmitted via hollow shaft 16 and the transmission configuration of gear 29, which is also coupled with the hollow shaft, and intermediate gear 27 to shaft 26.

Thus the power $P_{VM}$ of the internal combustion engine is divided in planetary gear train 30, with the smaller part $P_{Steg}$ flowing directly to the take-off, in particular output shaft 18, and the larger part plus the power $P_E$ of electrical machine 40 to the take-off through variable speed drive 20, utilizing an appropriate variable speed drive transmission ratio. Clutch 17 is disengaged, clutches 13, 19, and 28 are engaged. The transmission ratio of the total system here is in the range of the maximum transmission ratio to 1, for example i=3.8 . . . 1, as can be seen from FIG. 6, and thus corresponds to underdrive. The transmission ratio i indicates the ratio of the speed of rotation between the transmission output shaft 18 $n_{ab}$ and the engine output shaft 12$n_{VM}$, i.e., i=$n_{ab}/n_{VM}$.

Figure 12:
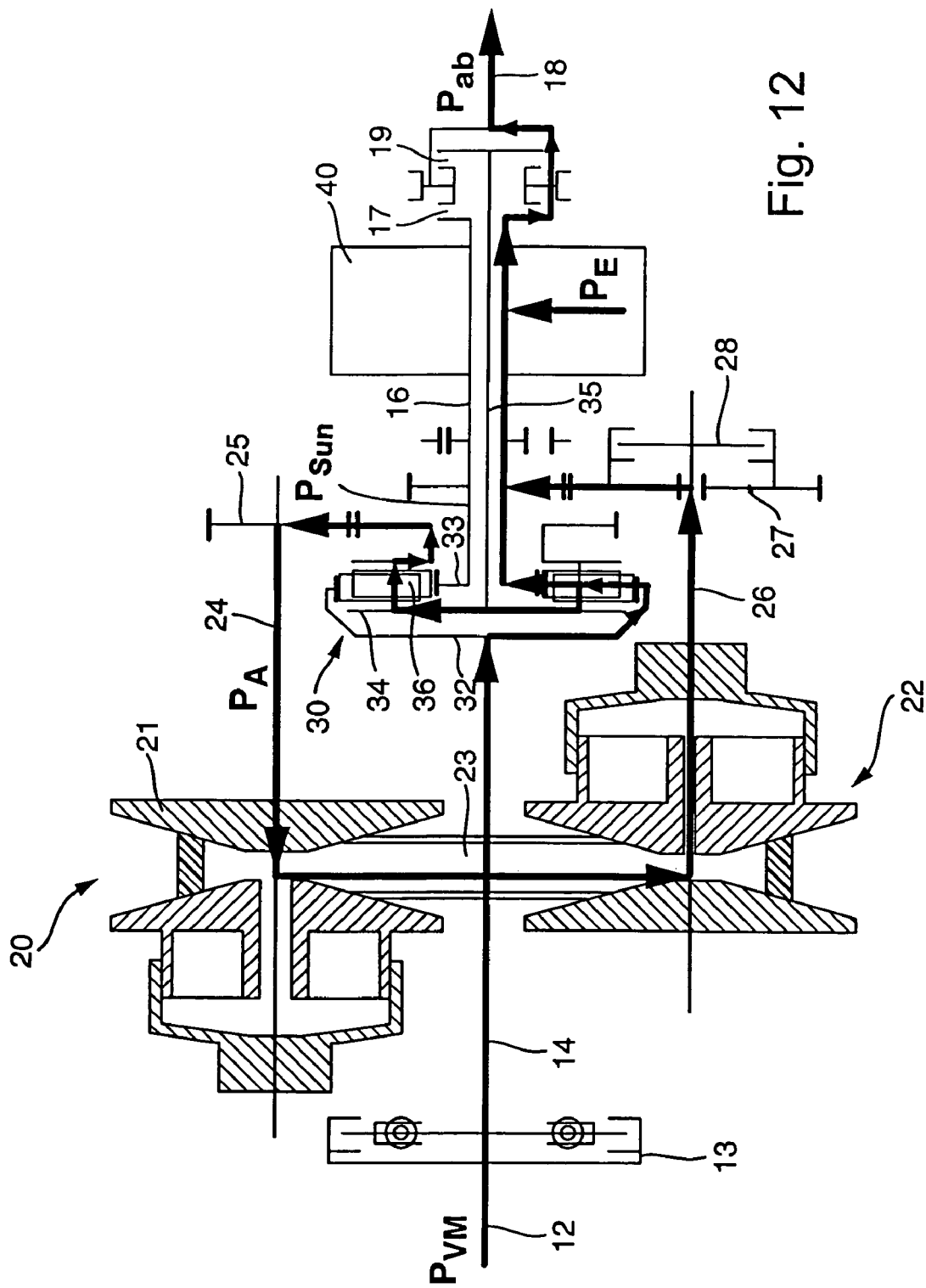
FIG. 12 is a schematic diagram of the flow of torque in the transmission in accordance with FIG. 1 in a second operating region.

Finally, FIG. 12 shows the second operating region, designed in particular as overdrive for transmission ratios i<1, for example i=0.1 . . . 0.633. In contrast to the first operating region shown in FIG. 11, in the second operating region shown in FIG. 12 clutch 19 is disengaged, while clutch 17 is engaged. That means that a direct connection is produced between output shaft 18 and hollow shaft 16, which is connected to sun gear 33 of the planetary gear train in a rotationally fixed connection, and the torque is taken off through that connection.

As in the first operating region, the power $P_{VM}$ of the internal combustion engine is divided in the planetary gear train, with the larger part $P_{sun}$ of the power of the internal combustion engine $P_{VM}$ plus the power of electrical machine 40 $P_E$ flowing directly to the take-off via the engaged clutch 17. A smaller part $P_A$ flows via the variable speed drive to the take-off, namely through planet pinion carrier 32 and gear 25, which is connected to the shaft 24 of the first conical disk pair 21 of the variable speed drive 20, through the endless torque-transmitting means 23 to the second conical disk pair 22 of the variable speed drive 20, and there through the engaged clutch 28 and gear 27 to hollow shaft 16. In that operating region, $P_A$ as the power transmitted via the variable speed drive is smaller than the power transmitted via sun gear 33: $P_A<P_{sun}$.

Because of the provision of two operating regions, only a relatively small variation range is necessary in the variable speed drive. Furthermore, on average only a very small part of the power flows through the variable speed drive, which contributes to protecting the variable speed drive from possible high torque levels, and thereby increasing the operating life of the variable speed drive components. The number of operating regions is reduced to two, which reduces the complexity of the transmission control and also dynamically highly demanding components; the division of power is always unequal, so that in the most frequent operating conditions of the transmission the torques transmitted through the variable speed drive become minimal.

Figure 13:
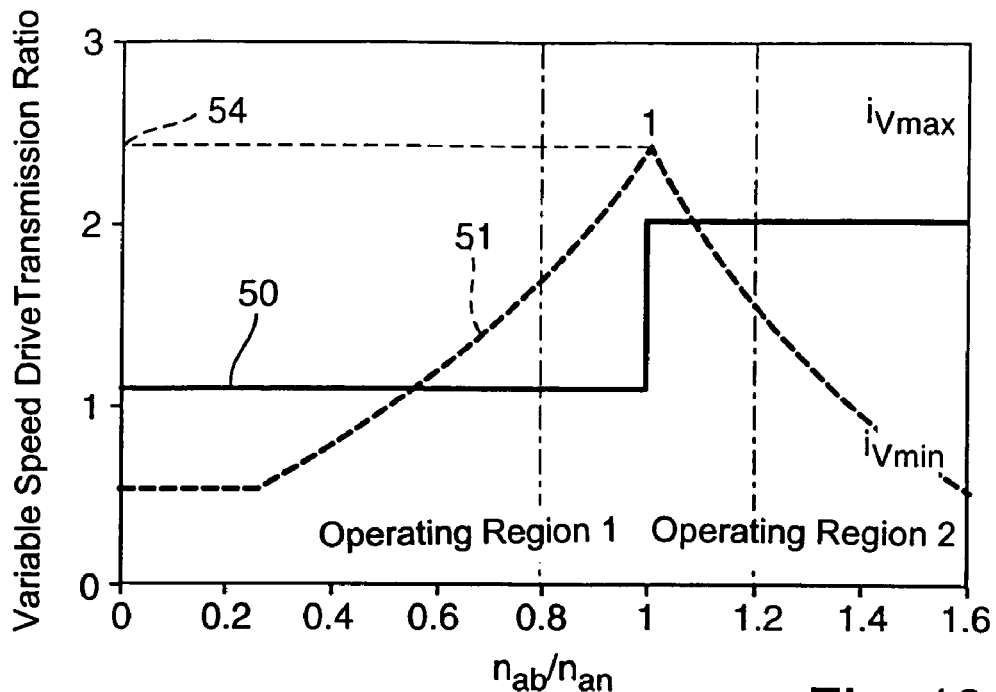
FIG. 13 is a diagram of the variable speed drive transmission ratios in the first and second operating regions for the transmission in accordance with FIG. 1.

In FIG. 13, for the transmission ratios i=$n_{ab}/n_{an}$, plotted on the X axis, i.e., the torque of the output shaft 18 to torque of the engine output shaft 12, line 50 indicates the respective operating regions (first and second operating regions) and line 51 indicates the corresponding variable speed drive transmission ratios. Line 54 shows at what variable speed drive transmission ratio i the transmission can change particularly advantageously from one operating region to the other without a jump in the transmission ratio. It is evident that the curves of the variable speed drive transmission ratios in the two operating regions are oppositely directed in that they slope in opposite directions. The illustration shows the case for a maximum variable speed drive transmission ratio of 2.451 (line 54) and a minimum variable speed drive transmission ratio of 0.408, which corresponds to a ratio of maximum variable speed drive transmission to minimum variable speed drive transmission of about 6.

Figure 14:
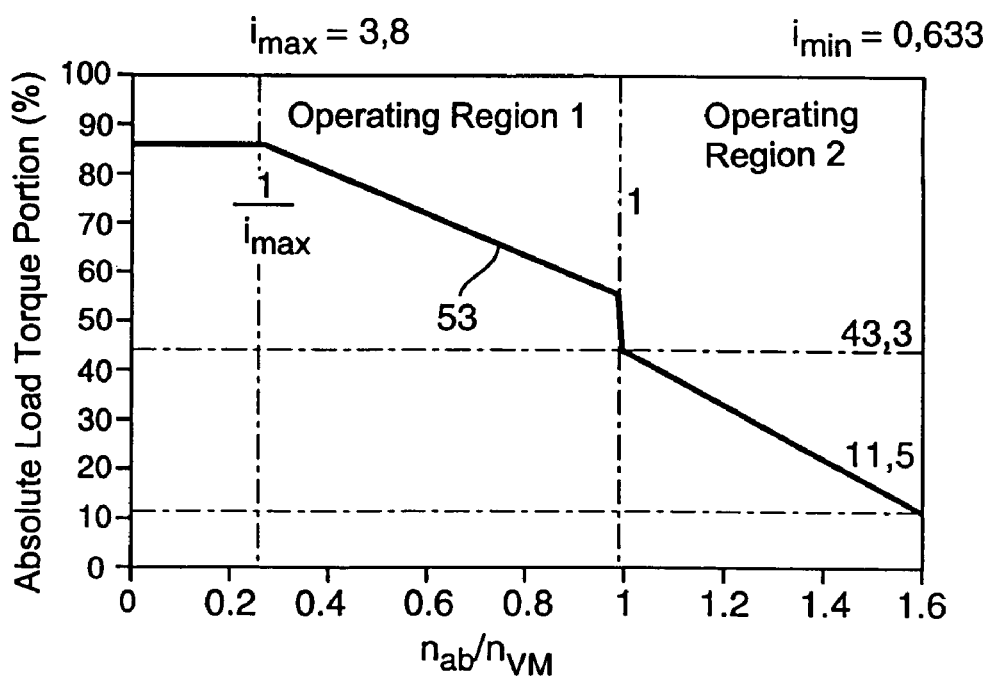
FIG. 14 shows the proportion of adjusting force for a transmission in accordance with FIG. 1 in the first and second operating regions.

FIG. 14 provides the absolute load torque portion of the variable speed drive in percent. In the most frequent driving situations the load torque portion of the variable speed drive is low. That is accomplished by the fact that an uneven division of power always takes place in planetary gear train 30, in both the first and the second operating regions. Thus, the power of the internal combustion engine is not divided into halves, but in such a way that the greatest possible relief of the variable speed drive is possible, and the load torque portion of the variable speed drive is low in the most frequent driving situations.

Figure 15:
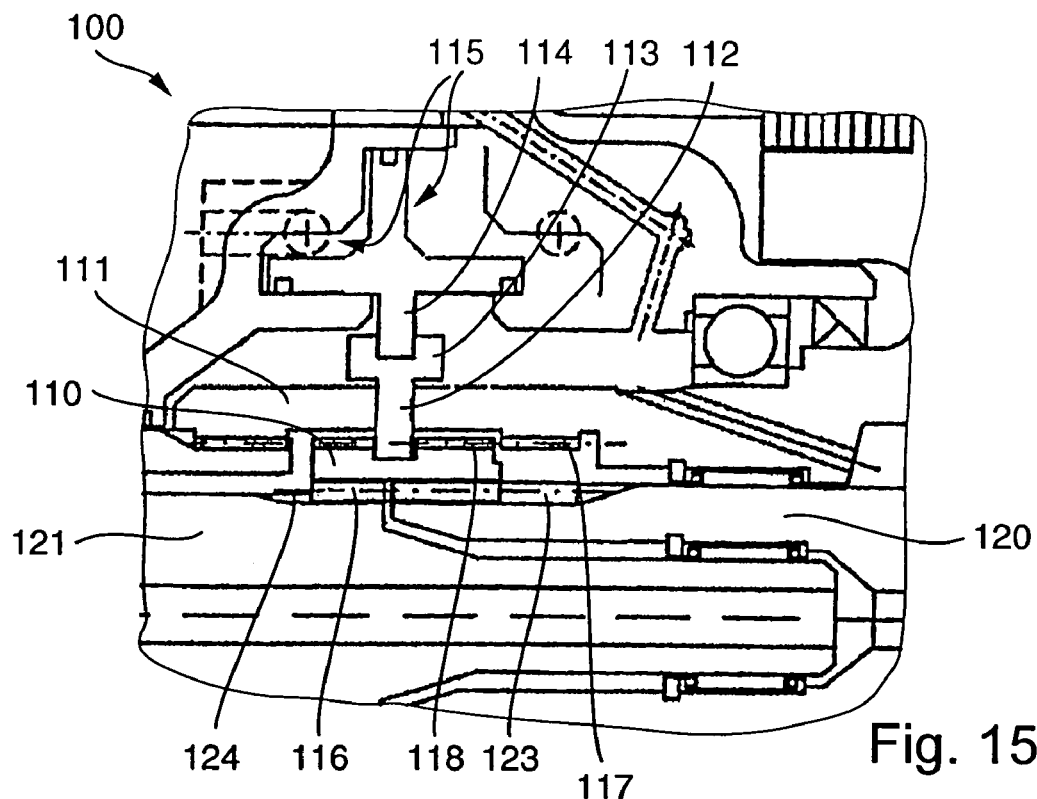
FIG. 15 is a fragmentary view showing a shift element in accordance with the invention.
Figure 16:
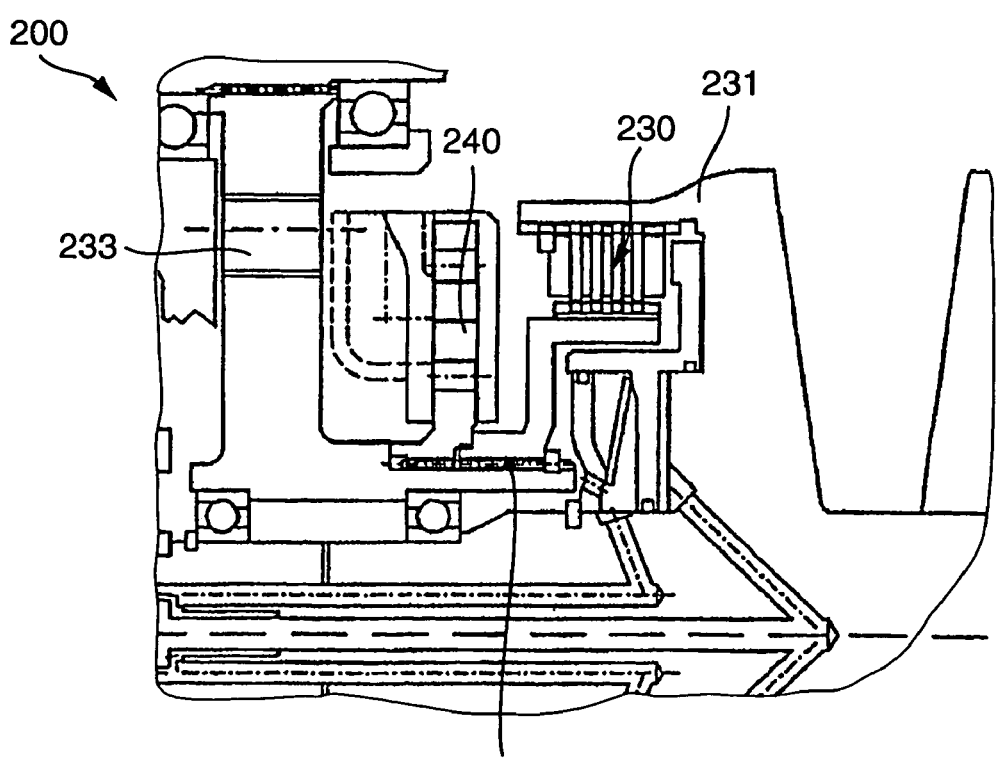
FIG. 16 is a fragmentary view showing a variable speed drive clutch unit in accordance with the invention.
Figure 17:
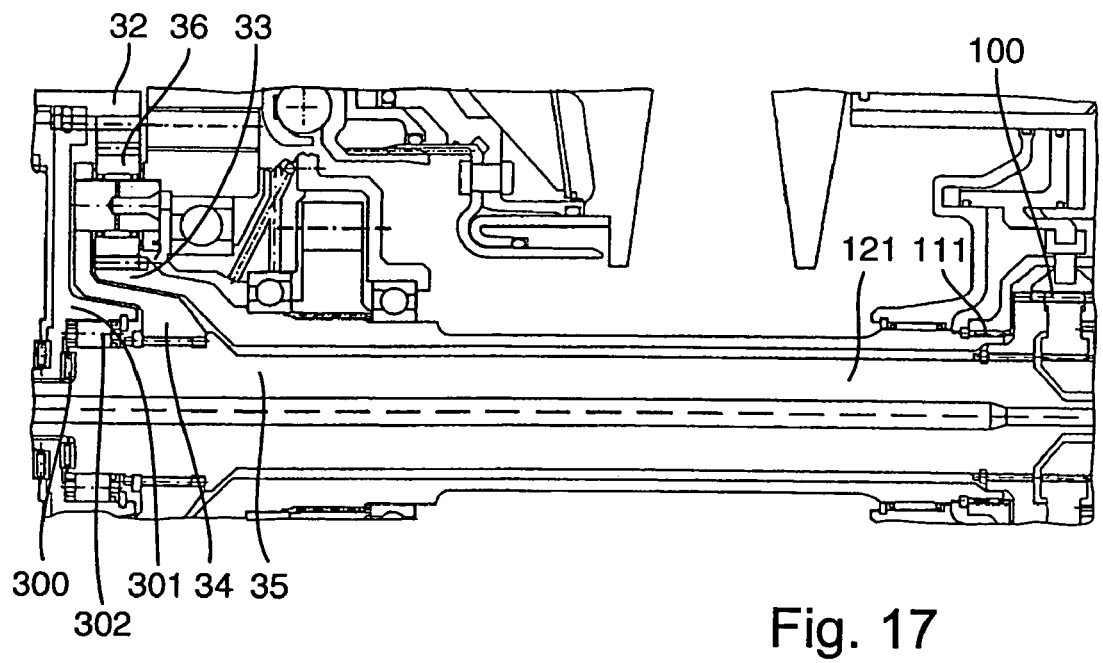
FIG. 17 is a fragmentary view showing a freewheel system in accordance with the invention for stabilizing the shifting point.

FIGS. 15, 16, and 17 show a shift system for clutch components, a variable speed drive clutch unit, and a freewheel system for shift point stabilization, which are suitable for use in particular in a power-branched transmission like that described in connection with FIGS. 1 through 14. But in principle the systems are also usable in general for CVT transmissions, or for other types of transmissions.

The shift system shown in FIG. 15 is usable, for example, for the clutch system between the hollow shaft 16, the shaft 35, which is firmly connected to the planet pinion carrier of planetary gear train 30, and the output shaft 18, to the clutch system of clutches 17, 19 that is utilized. FIG. 15 is a detailed section of FIG. 4.

Shift system 100 is designed so that a ring-shaped shift element 110 is movable and operates as a coupling element in such a way that it has no neutral zone when running through the shift path. That makes the shift path as short as possible, which is advantageous for an e-CVT transmission in accordance with the transmission described above because of the high degree of necessary dynamics. In particular, the system 100 has a first shaft 120 and a second shaft 121 that rotate about a common axis of rotation, and which have an essentially common aligned configuration, at least in one region, namely in the region in which shift element 110 takes effect. Both first shaft 120 and second shaft 121 have external teeth 123, 124, which can be brought into engagement with the internal teeth 116 of the ring-shaped shift element. Here the length of shift element 110 in the axial direction of the shafts 120, 121 is such that the shift element can be engaged simultaneously with both external tooth regions 123, 124, thus making transmission of torque with shaft 121 possible.

Also provided is a hollow shaft 111 surrounding first and second shafts 120, 121 and shift element 110, which hollow shaft 111 has internal teeth 117 in a region located opposite the toothed regions 123, 124 of shafts 120, 121. In the illustrated embodiment, the internal teeth 117 are provided opposite both the toothed region 124 and the toothed region 123. The internal teeth 117 of hollow shaft 111 can become engaged with external teeth 118 on the shift element, so that when shift element 110 is moved in the axial direction of shafts 120, 121 and hollow shaft 111, the shift element is able to provide a connection between the teeth 123 of shaft 120 and the internal teeth 117 of hollow shaft 111, or, if it is slid all the way to the left in the figure, it can provide a connection between the external teeth 124 of shaft 121 and the internal teeth 117 of hollow shaft 111, so that transmission of torque between one of the shafts 120, 121 and the hollow shaft 111 is optionally possible. Depending upon need, one of the connection functions can also be left out, so that, for example, shift element 110 can only produce a connection between shafts 121, 120 or between shaft 120 and hollow shaft 111, but no connection between hollow shaft 111 and shaft 121.

To move shift element 110 in the axial direction of shafts 120, 121, 111, a pin 112 is provided that is engaged with shift element 110 and which, starting from a sliding sleeve 113 that is coaxial with hollow shaft 111 and turns coaxially with it, is passed through an elongated opening (not shown) in hollow shaft 111 and is engaged with shift element 110. A gearshift fork 114 is stationary and is axially actuated hydraulically by pressure chambers 115 that are also stationary, so that sliding sleeve 113 is moved axially, and thereby pin 112, which extends through the elongated openings in hollow shaft 111, is moved along with it, which actuates shift element 110. Because of the stationary pressure chambers 115, a simplification is achieved compared to pressure chambers that rotate along with the shafts, since rotation guides are not needed and no compensation for centrifugal forces in the hydraulic fluid is necessary.

In FIG. 16, finally, a variable speed drive clutch unit 200 is shown that can be integrated directly into a fixed disk of the variable speed drive. In particular in the case of the arrangement of the e-CVT transmission shown in FIG. 2, the variable speed drive clutch unit 200 can be integrated for into conical disk 22a, for example, which is the fixed disk of conical disk pair 22, as a clutch 28.

In principle, the severe bending of variable speed drive shafts and the limited possibility of boring holes for hydraulic actuating elements in the variable speed drive shafts make it difficult to position additional structural elements on a variable speed drive shaft. For example, the associated clutches and reversing gear sets, as shown also in FIGS. 1, 2, and 3, are executed as separate kits. Sometimes a separate shaft is also provided for them.

With the embodiment shown in FIG. 16 for a variable speed drive clutch unit 200, on the other hand, the bending and hence a rotating unevenness of the load on the clutch linings 230, which are integrated into a recess in the fixed disk 231 of a variable speed drive, is consciously accepted. Clutch 230 is executed, for example, as a multiple-plate clutch, but other clutches, in particular friction clutches, can also be used. Single-disk or multiple-disk clutches are also possible, as long as they are able to transmit the requisite torques. The friction linings of one side of the clutch are firmly connected to the variable speed drive, in particular the fixed disk 231 of the variable speed drive, which thus represents a very rigid arrangement of a clutch side or a frictional surface side 230 with the fixed disk. The other side of the clutch, which produces the connection to the opposing part, is guided in a socket tooth connection 232. The socket tooth connection 232 cushions deformations, so that, for example, gear 233 that is provided further along in the power stream is sufficiently uncoupled to compensate for contact pattern changes that arise due to the bending of the variable speed drive shafts.

In a similar manner, it is also possible, for example, to connect a pump 240, for example pump 42 of FIG. 1, by way of the socket tooth connection. Positioning the multiple-plate clutch 230 rigidly in a recess in the variable speed drive thus represents a contribution to saving space. The deformation is compensated for by means of a separate part, namely in that case the socket tooth connection 232.

FIG. 17 shows the installation condition of freewheel 302, which, in accordance with the invention, ensures that the shift transmission ratio can be set exactly, so that the shift can be accomplished without jolts by a positive-contact shift element 100. That problem-free actuation of the shift element is made possible because parts 111 and 121 are rotating at the same speed when the freewheel 302 is locked.

The freewheel 302 is designed here to be effective between ring gear 32 or a support piece 301 that is connected to the ring gear, and planet pinion carrier 34. The freewheel locks as soon as ring gear 32 threatens to overtake planet pinion carrier 34. That is the case when planet pinion carrier 34, or the shaft 35 which is connected to it, in turn threatens to overtake the sun gear 32.

The condition of locking of the freewheel is produced by intentionally triggering the variable speed drive to a transmission ratio above the shift transmission ratio 54 (see FIG. 13). With that triggering for example through applying pressure, disk set shaft 21 is accelerated with respect to disk set shaft 22. Since disk set shafts 21 and 22 are connected via spur gear stages to planet pinion carrier 34 and sun gear 33, respectively, the condition for locking is fulfilled.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A power-branched transmission having a plurality of transmission ratio ranges and having a continuously variable transmission ratio, said transmission comprising: a drive shaft operatively connected to an engine output shaft with a rotationally fixed connection, a power divider, a variable speed drive, and a transmission output shaft, wherein the power divider is a planetary gear train that includes a sun gear, an internal ring gear, and a planet carrier having planet gears engaged with each of the sun gear and the internal ring gear, wherein the drive shaft is directly coupled with the internal ring gear of the planetary gear train, wherein the power divider includes a hollow outer shaft non-rotatably connected with the sun ear and an inner shaft rotatably carried within and coaxial with the hollow outer shaft and non-rotatably connected with the planet carrier, a first clutch connected between the inner shaft and the transmission output shaft, and a second clutch connected between the hollow outer shaft and the first clutch, wherein the first and second clutches are positioned downstream from the variable speed drive in a direction of power flow from the engine output shaft to the transmission output shaft.

2. A power-branched transmission in accordance with claim 1, wherein the drive shaft and the ring gear of the planetary gear train are connected with the engine output shaft by a drive clutch.

3. A power-branched transmission in accordance with claim 1, wherein the variable speed drive is positioned between the power divider and the engine output shaft.

4. A power-branched transmission in accordance with claim 1, wherein an electrical machine is positioned between the power divider and the transmission output shaft.

5. A power-branched transmission in accordance with claim 4, wherein the variable speed drive is positioned between the power divider and the electrical machine.

6. A power-branched transmission in accordance with claim 5, wherein a branching of power takes place in branches within the power divider, in such a way that the transmission output shaft is operatively connected to the engine drive shaft and bypasses the variable speed drive, and the transmission output shaft is connected to the drive shaft through the variable speed drive, and wherein the division of power within the power divider is unequal in the respective branches.

7. A power-branched transmission in accordance with claim 4, wherein the electrical machine is connected to a shaft that is connected to a sun gear of the planetary gear train with a rotationally fixed connection.

8. A power-branched transmission in accordance with claim 4, wherein the electrical machine is positioned within a transmission housing component that also receives the variable speed drive and the power divider, and wherein when viewed in a longitudinal direction of the transmission from the engine drive shaft to the transmission output shaft, the electrical machine is positioned on one side of the variable speed drive and the power divider is positioned on an opposite side of the variable speed drive.

9. A power-branched transmission in accordance with claim 8, wherein the electrical machine is received within a separate rear transmission housing component, which is flange mounted on a transmission housing component that receives the variable speed drive and the power divider.

10. A power-branched transmission in accordance with claim 8, wherein the variable speed drive includes respective input and output shaft axes that define a plane, and the engine drive shaft and the transmission output shaft lie outside of and parallel to the plane defined by the variable speed drive shaft axes.

11. A power-branched transmission in accordance with claim 8, wherein one of the shafts of the variable speed drive is coupled through a clutch with a shaft that is connected to the a gear of the planetary gear train with a rotationally fixed connection, and the other shaft of the variable speed drive is connected to a planet pinion carrier of the planetary gear train.

12. A power-branched transmission in accordance with claim 1, wherein the planetary gear train is a reversing planetary gear train.

13. A power-branched transmission in accordance with claim 1, wherein a clutch is provided with which at least one of a shaft that is connected to the sun gear of the planetary gear train with a rotationally fixed connection and a shaft that is connected to the planet pinion carrier of the planetary gear train with a rotationally fixed connection is connected to the transmission output shaft.

14. A power-branched transmission in accordance with claim 1, including a first shaft and a second shaft that are arranged along a common axis, and whose outer surfaces are each provided with a toothed profile in at least a boundary region between the first and the second shafts; a hollow shaft that encloses the first and second shafts and that includes internal teeth in a boundary region of at least one of the first and the second variable speed drive shafts; a ring-shaped shift element that includes internal teeth that engage with the teeth of at least one of the first and second variable speed drive shafts, and that includes external teeth that engage with the internal teeth of the hollow shaft; wherein the shift element is movable in the axial direction of the first and second variable speed drive shafts and of the hollow shaft by an actuating device, so that the shift element can selectively be brought into simultaneous engagement with the internal teeth of the hollow shaft and the external teeth of at least one of the first and second shafts of the variable speed drive, and can be brought into simultaneous engagement with the external teeth of the first and the second shafts, without passing through a neutral zone.

15. A power-branched transmission in accordance with claim 14, including a clutch arrangement between the transmission output shaft, a shaft that rotates with the planet pinion carrier of the planetary gear train, and a shaft that rotates with the sun gear of the planetary gear train.

16. A power-branched transmission in accordance with claim 1, including a variable speed drive clutch unit for connecting the variable speed drive with an opposing component for frictional transmission of power, said clutch unit including frictional surfaces, and wherein a frictional surface of one side of the clutch unit is firmly connected to one disk of the variable speed drive.

17. A power-branched transmission in accordance with claim 1, wherein all of the rotational speeds in the power divider are set the same by a freewheel when the variable speed drive is triggered beyond a predetermined range change transmission ratio.

18. A power-branched transmission in accordance with claim 17, including a shift system that is actuated when the variable speed drive is triggered beyond the predetermined range change transmission ratio.

* * * * *